US012133527B2

(12) United States Patent
Roe et al.

(10) Patent No.: US 12,133,527 B2
(45) Date of Patent: *Nov. 5, 2024

(54) INSECT AND TICK REPELLENT FORMULATIONS AND METHODS OF USE THEREOF

(71) Applicants: NORTH CAROLINA STATE UNIVERSITY, Raleigh, NC (US); MIMIKAI, Danville, CA (US)

(72) Inventors: Richard Michael Roe, Middlesex, NC (US); Stephanie Watson, Danville, CA (US); Heather Beach, East Calais, VT (US)

(73) Assignees: North Carolina State University, Raleigh, NC (US); MIMIKAI, Danville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,504

(22) Filed: Jan. 24, 2023

(65) Prior Publication Data

US 2023/0157278 A1 May 25, 2023

Related U.S. Application Data

(63) Continuation of application No. 16/958,102, filed as application No. PCT/US2018/067625 on Dec. 27, 2018.

(60) Provisional application No. 62/611,178, filed on Dec. 28, 2017.

(51) Int. Cl.
| | |
|---|---|
| *A01N 35/02* | (2006.01) |
| *A01N 25/02* | (2006.01) |
| *A01N 25/04* | (2006.01) |
| *A01N 31/02* | (2006.01) |
| *A01N 31/06* | (2006.01) |
| *A01N 65/20* | (2009.01) |
| *A01N 65/28* | (2009.01) |
| *A01N 65/40* | (2009.01) |
| *A01P 17/00* | (2006.01) |

(52) U.S. Cl.
CPC ............ *A01N 35/02* (2013.01); *A01N 25/02* (2013.01); *A01N 25/04* (2013.01); *A01N 31/02* (2013.01); *A01N 31/06* (2013.01); *A01N 65/20* (2013.01); *A01N 65/28* (2013.01); *A01N 65/40* (2013.01); *A01P 17/00* (2021.08)

(58) Field of Classification Search
None
See application file for complete search history.

(56) References Cited

U.S. PATENT DOCUMENTS

| | | | |
|---|---|---|---|
| 4,775,532 A | 10/1988 | Clayton | |
| 11,627,739 B2* | 4/2023 | Roe | A01N 31/06 |
| | | | 424/405 |
| 2004/0242703 A1 | 12/2004 | Roe | |
| 2010/0227010 A1 | 9/2010 | Allen | |
| 2018/0035674 A1* | 2/2018 | Schmidt | A01N 49/00 |
| 2022/0183283 A1* | 6/2022 | Collette | A01N 65/44 |

FOREIGN PATENT DOCUMENTS

| | | |
|---|---|---|
| CN | 106847691 A | 6/2017 |
| WO | 2018026901 A1 | 2/2018 |

OTHER PUBLICATIONS

EPA Methyl Nonyl Ketone Preliminary Work Plan and Summary Document. EPA-HQ-OPP-2012-0125, Environmental Protection Agency, pp. 1-46, 2012, retrieved from the Internet:< https://www.regulations.gov/document/EPA-HQ-OPP-2012-0125-0002>.
Parachem Safety Data Sheet, Sodium Lauryl Sulfate, pp. 1-6, 2015, retrieved from the Internet: <https://www.parchem.com/siteimages/Attachment/GHS%20Sodium%20Lauryl%20Sulfate%20MSDS.pdf>.
"International Preliminary Report on Patentability Notification and Written Opinion, PCT/US2018/067625, mailed Jun. 30, 2020, 6 pages".
"International Search Report corresponding to PCT/US2018/067625, mailed Mar. 26, 2019, 3 pages".
Marathon Safety Data Sheet—Marathon Petroleum SE1885 Soy Methyl Ester, Marathon Petroleum Company LP, 2016, pp. 1-9, retrieved from the internet:<https://www.marathonpetroleum.com/content/documents/Operations/MPC_SDS/Marathon_Petroleum_ SE 1885 Soy Methyl_Ester 0350 MARO 19 .pdf>.

* cited by examiner

*Primary Examiner* — John Pak
(74) *Attorney, Agent, or Firm* — Myers Bigel, P.A.

(57) ABSTRACT

The invention relates to a formulation comprising: 2-undecanone in an amount of about 5% to about 50%; at least one hydrophobic base in an amount of about 5% to about 65%; at least one alcohol in an amount of about 5% to about 50%; and at least one emulsifier in an amount of about 5% to about 15% and methods of repelling insects and ticks by applying to a subject or a substrate a formulation of the invention.

25 Claims, 1 Drawing Sheet

INSECT AND TICK REPELLENT FORMULATIONS AND METHODS OF USE THEREOF

STATEMENT OF PRIORITY

This application is a continuation application of U.S. patent application Ser. No. 16/958,102, filed on Jun. 25, 2020, a 35 U.S.C. § 371 national phase application of International Application Serial No. PCT/US2018/067625, filed Dec. 27, 2018, which claims the benefit, under 35 U.S.C. § 119 (e), of U.S. Provisional Application No. 62/611,178 filed on Dec. 28, 2017, the entire contents of each of which is incorporated by reference herein.

FIELD OF THE INVENTION

The present invention concerns methods and formulations for repelling insects and ticks.

BACKGROUND OF THE INVENTION

Insect and tick repellants are widely used throughout the United States and throughout the world. In some regions, the use of repellants is important for avoiding or reducing the occurrence of diseases carried by insects and ticks. For example, the Centers for Disease Control (CDC) receives nearly 10,000 reports of Lyme disease (transmitted by deer ticks) and 1,000 reports of encephalitis (transmitted by mosquitoes) annually.

Currently, the most common repellent is N,N-diethyl-meta-toluamide (DEET). DEET was designed to be applicable to the skin of subjects, and is designed to repel rather than kill insects and ticks. Although in use for some time, concern has recently emerged about the potential toxicity of DEET to children. Recently the US Environmental Protection Agency (EPA) determined that it would no longer allow child safety claims on labels for DEET-containing products.

Improved insect and tick repellants useful for all persons are needed.

SUMMARY OF THE INVENTION

A first aspect of the invention provides a formulation comprising: 2-undecanone in an amount of about 5% to about 50% by volume; at least one hydrophobic base in an amount of about 5% to about 65% by volume; at least one alcohol in an amount of about 5% to about 50% by volume; and at least one emulsifier in an amount of about 5% to about 15% by volume.

A second aspect provides a formulation comprising: 2-undecanone in an amount of about 5% to about 30% by volume; at least one hydrophobic base in an amount of about 25% to about 40% by volume; at least one alcohol in an amount of about 25% to about 40% by volume; and at least one emulsifier in an amount of about 5% to about 15% by volume.

A third aspect of the invention provides a formulation comprising: 2-undecanone in an amount of about 10% to about 25% by volume; at least one hydrophobic base in an amount of about 25% to about 35% by volume; at least one alcohol in an amount of about 25% to about 40% by volume; and at least one emulsifier in an amount of about 5% to about 15% by volume.

A fourth aspect of the invention provides a method of repelling an insect pest or a tick, comprising: applying to a subject a formulation of the present invention in an amount effective to repel the insect or tick.

DETAILED DESCRIPTION

The present invention now will be described hereinafter with reference to the accompanying drawings and examples, in which embodiments of the invention are shown. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also, as used herein, "and/or" refers to and encompasses any and all possible combinations of one or more of the associated listed items, as well as the lack of combinations when interpreted in the alternative ("or").

The term "about," as used herein when referring to a measurable value such as a dosage or time period and the like refers to variations of ±10%, ±5%, ±1%, ±0.5%, or even ±0.1% of the specified amount. As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

The term "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

As used herein, the terms "increase," "increasing," "increased," "enhance," "enhanced," "enhancing," and "enhancement" (and grammatical variations thereof) describe an elevation of at least about 25%, 50%, 75%, 100%, 150%, 200%, 300%, 400%, 500% or more as compared to a control.

As used herein, the terms "reduce," "reduced," "reducing," "reduction," "diminish," and "decrease" (and grammatical variations thereof), describe, for example, a decrease of at least about 5%, 10%, 15%, 20%, 25%, 35%, 50%, 75%, 80%, 85%, 90%, 95%, 97%, 98%, 99%, or 100% as compared to a control. In particular embodiments, the reduction can result in no or essentially no (i.e., an insignificant amount, e.g., less than about 10% or even 5%) detectable activity or amount.

The present invention provides monophasic formulations comprising undecanone for use in repelling insects and/or ticks. Thus, in some embodiments, the formulations of the invention are not in the form of emulsions but are in a single phase.

In some embodiments, the formulations may be in the form of an emulsion that is homogeneous.

In some embodiments, the formulations of the invention may be used to repel animals generally including, but not limited to, insects, ticks, spiders, hunting spiders, and scorpions.

Notably, 2-undecanone alone is not an effective insect or tick repellent for at least the reasons that it evaporates too fast and its duration of repellency is less than about 30 min. The formulations of the present invention comprising 2-undecanone, at least one hydrophobic base (for example, a seed oil), at least one alcohol, and at least one emulsifier provide significant repellency lasting over many hours after application to a subject.

Accordingly, in some embodiments, the present invention provides a formulation comprising: 2-undecanone in an amount of about 5% to about 50% by volume (e.g., about 5%, 10%, 15%, 20%, 25%, 30%, 35%, 40%, 50%, or any range or value therein); at least one hydrophobic base in an amount of about 5% to about 65% by volume (e.g., about 5%, 10%, 15%, 20%, 25%, 30%, 35%, 40%, 50%, 55%, 60%, 65%, or any range or value therein); at least one alcohol in an amount of about 5% to about 50% by volume (e.g., about 5%, 10%, 15%, 20%, 25%, 30%, 35%, 40%, 50%, or any range or value therein); and at least one emulsifier (i.e., total amount of all emulsifiers) in an amount of about 5% to about 15% by volume (e.g., about 5%, 6%, 7%, 8%, 9%, 10%, 11%, 12%, 13%, 14%, 15%, or any range or value therein). In some embodiments, the total amount of hydrophobic base in the formulation may be in a range from about 5%-65% by volume of the formulation. In some embodiments, the total amount of alcohol in the formulation may be in a range from about 5% to about 50% by volume of the formulation. In some embodiments, the total amount of emulsifier in the formulation may be in a range from about 5% to about 15% by volume of the formulation.

In some embodiments, a formulation is provided comprising: 2-undecanone in an amount of about 5% to about 30% by volume (e.g., about 5%, 10%, 15%, 20%, 25%, 30%, or any range or value therein); at least one hydrophobic base in an amount of about 25% to about 40% by volume (e.g., about 25%, 26%, 27%, 28%, 29%, 30%, 13%, 32%, 33%, 34%, 35%, 36%, 37%, 38%, 39%, 40%, or any range or value therein); at least one alcohol in an amount of about 25% to about 40% by volume (e.g., about 25%, 26%, 27%, 28%, 29%, 30%, 31%, 32%, 33%, 34%, 35%, 36%, 37%, 38%, 39%, 40% by volume, or any range or value therein); and at least one emulsifier (i.e., total amount of all emulsifiers) in an amount of about 5% to about 15% by volume or about 5% to about 15% by volume (e.g., about 5%, 6%, 7%, 8%, 9%, 10%, 11%, 12%, 13%, 14%, 15%, or any range or value therein). In some embodiments, the total amount of hydrophobic base in the formulation may be in a range from about 25%-40% by volume of the formulation. In some embodiments, the total amount of alcohol in the formulation may be in a range from about 25% to about 40% by volume of the formulation. In some embodiments, the total amount of emulsifier in the formulation may be in a range from about 5% to about 15% by volume of the formulation.

In some embodiments, the present invention provides a formulation comprising: 2-undecanone in an amount of about 10% to about 25% by volume (e.g., about 10%, 15%, 20%, 21%, 22%, 23%, 24%, 25%, or any range or value therein; e.g., about 12% to about 16%, about 12% to about 17%, about 13% to about 16%, about 13% to about 17%, about 14% to about 16% by volume, or any range or value therein); at least one hydrophobic base in an amount of about 25% to about 35% by volume (e.g., about 25%, 26%, 27%, 28%, 29%, 30%, 31%, 32%, 33%, 34%, 35%, or any range or value therein; e.g., about 26% to about 33%, about 26% to about 35%, about 28% to about 32%, about 28% to about 33%, about 28% to about 35%,%, or any range or value therein); at least one alcohol in an amount of about 25% to about 40% by volume (e.g., about 25%, 26%, 27%, 28%, 29%, 30%, 31%, 32%, 33%, 34%, 35%, 36%, 37%, 38%, 39%, 40%, or any range or value therein; e.g., about 30% to about 38%, about 30% to about 40%, about 32% to about 37%, about 32% to about 38%, about 33% to about 37%, about 33% to about 36%, or any range or value therein); and at least one emulsifier (i.e., total amount of all emulsifiers) in an amount of about 5% to about 15% by volume or about 5% to about 15% by volume (e.g., about 5%, 6%, 7%, 8%, 9%, 10%, 11%, 12%, 13%, 14%, 15%, or any range or value therein; e.g., about 7% to about 12%, about 7% to about 13%, about 7% to about 14%, about 8% to about 11%, about 8% to about 12%, about 8% to about 13%, or any range or value therein). In some embodiments, a formulation is provided comprising 2-undecanone in an amount of about 10% to about 20% by volume (e.g., about 10%, 11%, 12%, 13%, 14%, 15%, 16%, 17%, 18%, 19%, 20%, or any range or value therein); at least one hydrophobic base in an amount of about 30% to about 40% by volume (e.g., about 30%, 31%, 32%, 33%, 34%, 35%, 36%, 37%, 38%, 39%, 40%, or any range or value therein); at least one alcohol in an amount of about 30% to about 40% by volume (e.g., about 30%, 31%, 32%, 33%, 34%, 35%, 36%, 37%, 38%, 39%, 40%, or any range or value therein); and at least one emulsifier (i.e., total amount of all emulsifiers) in an amount of about 5% to about 15% by volume (e.g., about 5%, 6%, 7%, 8%, 9%, 10%, 11%, 12%, 13%, 14%, 15%, or any range or value therein). In some embodiments, the total amount of hydrophobic base in the formulation may be in a range from about 25%-35% by volume of the formulation or about 30% to about 40% by volume of the formulation. In some embodiments, the total amount of alcohol in the formulation may be in a range from about 25% to about 40% by volume of the formulation or about 30% to about 40% by volume of the formulation. In some embodiments, the total amount of emulsifier in the formulation may be in a range from about 5% to about 15% by volume of the formulation.

2-undecanone (also known as methyl nonyl ketone) comprises the structure of wherein R is $C_9$.

(I)

The formulations of the invention comprise a hydrophobic base. "Hydrophobic base" as used herein refers to a natural and/or synthetic fat, oil, and/or the like. Any suitable hydrophobic base may be used in a formulation of the present invention. In certain embodiments of the present invention, a formulation may comprise two or more hydrophobic bases, such as, but not limited to, 2, 3, 4, 5, or more hydrophobic bases. Exemplary hydrophobic bases include, but are not limited to, branched and unbranched hydrocarbons, hydrophobic polymers, fatty acids, fatty acid esters, monoglycerides, diglycerides, and/or triglycerides. A hydrophobic base may be partially or wholly saturated and/or unsaturated.

Additional exemplary hydrophobic bases may include, but are not limited to plant and/or vegetable oils, animal oils, and/or mineral oil. A plant-based oil may be any oil obtained from a plant or plant part (e.g., oil from seeds, flowers, fruit, leaves, bark, roots, etc). Exemplary plant oils include avocado oil, borage oil, canola (rapeseed) oil, castor oil, chamomile oil, coconut oil, corn oil, cottonseed oil, rapeseed oil, evening primrose oil, safflower oil, sunflower oil, soybean oil, sweet almond, palm oil, palm kernel oil, arctium lappa seed oil, sesame oil, borgo officialis seed oil, brassica campestris oleifera oil, brevoortia oil, bubulum oil, cistus ladaniferus oil, elaeis Guineensis oil, almond oil, pine oil, olive oil, peanut oil, flax seed oil, wheat germ oil, hemp oil, jojoba oil, linseed oil, macadamia oil, neem oil, argan oil, grape seed oil, thistle oil, and/or algal oil and/or any combination thereof.

In some embodiments, the molecular weight of a hydrophobic base useful with this invention may range from about 100 g/mol to about 1000 g/mol. Thus, in some embodiments, the molecular weight of a hydrophobic base useful with this invention may range from about 100 g/mol to about 750 g/mol, about 150 g/mol to about 750 g/mol, about 150 g/mol to about 500, about 150 g/mol to about 300 g/mol, and any range or value therein.

In some embodiments, a hydrophobic base may be a 16 carbon or 18 carbon compound or a combination thereof. In some embodiments, a hydrophobic base may be about 10-20% saturated. In some embodiments, a hydrophobic base may be about 75-90% unsaturated. In some embodiments, a hydrophobic base may have a density of about 0.91 to 0.93 g/cm3 between the temperatures of 15° C. and 25° C.

In some embodiments, a formulation of the invention comprises at least one hydrophobic base that is a plant-based oil. In some embodiments, the at least one plant-based oil of a formulation of the invention may comprise, consist essentially of, or consist of soybean oil. In some embodiments, the at least one seed oil of a formulation of the invention may comprise, consist essentially of, or consist of cottonseed oil. In some embodiments, the at least one seed oil of a formulation of the invention may comprise, consist essentially of coconut oil. In some embodiments, the at least one seed oil of a formulation of the invention may comprise, consist essentially of, or consist of soybean oil and cottonseed oil. In some embodiments, the at least one seed oil of a formulation of the invention may comprise, consist essentially of, or consist of soybean oil and coconut oil. In some embodiments, the at least one seed oil of a formulation of the invention may comprise, consist essentially of, or consist of cottonseed oil and coconut oil. In some embodiments, the at least one seed oil of a formulation of the invention may comprise, consist essentially of, or consist of soybean oil, cottonseed oil and coconut oil.

A formulation of the invention comprises at least one alcohol. Non-limiting examples of alcohols useful with the invention include ethanol, isopropyl alcohol, t-butyl alcohol, propyl alcohol, benzyl alcohol or any combination thereof. In some embodiments, the alcohol may come from denatured alcohol and/or vodka. In some embodiments, the at least one alcohol of a formulation of the invention may comprise, consist essentially of, or consist of ethanol. In some embodiments, the at least one alcohol of a formulation of the invention may comprise, consist essentially of, or consist of denatured ethanol. In some embodiments, the at least one alcohol of a formulation of the invention may comprise, consist essentially of, or consist of isopropyl alcohol. In some embodiments, the at least one alcohol of a formulation of the invention may comprise, consist essentially of, or consist of t-butyl alcohol. In some embodiments, the at least one alcohol of a formulation of the invention may comprise, consist essentially of, or consist of propyl alcohol. In some embodiments, the at least one alcohol of a formulation of the invention may comprise, consist essentially of, or consist of benzyl alcohol. In some embodiments, the at least one alcohol of a formulation of the invention may comprise, consist essentially of, or consist of ethanol and isopropyl alcohol. In some embodiments, the at least one alcohol of a formulation of the invention may comprise, consist essentially of, or consist of ethanol, isopropyl alcohol and denatured alcohol.

Any denatured alcohol may be used in a formulation of the invention. In some embodiments, a "specially denatured alcohol" (SDA) may be used. In some embodiments, the denatured alcohol can be 95% ethanol and 5% isopropanol by volume. In some embodiments, the denatured alcohol can be 90% ethanol and 10% methanol by volume.

In some embodiments, a formulation of the invention comprises an equal amount of alcohol to hydrophobic base. In some embodiments, a formulation of the invention comprises about 3%-10% more alcohol than hydrophobic base (e.g., 3%, 4%, 5%, 6%, 7%, 8%, 9%, 10% vol./vol. more alcohol than hydrophobic base) (e.g., about 40% alcohol to about 30% hydrophobic base, about 40% alcohol to about 35% hydrophobic base, about 38% alcohol to about 30% hydrophobic base, about 35% alcohol to about 32% hydrophobic base, about 35% alcohol to about 30% hydrophobic base, about 35% alcohol to about 25% hydrophobic base, about 30% alcohol to about 25% hydrophobic base, about 34% alcohol to about 30% hydrophobic base and the like).

In some embodiments, a formulation of the invention comprises about two times the amount of hydrophobic base to alcohol (e.g., about 30% hydrophobic base to about 15% alcohol, about 40% hydrophobic base to about 20% alcohol, about 50% hydrophobic base to about 25% alcohol; about 60% hydrophobic base to about 30% alcohol, and the like).

A formulation of the invention further comprises emulsifiers to assist in maintaining a stable monophasic system. Non-limiting examples of an emulsifier include polysorbate 20, sorbitan oleate, potassium sorbate, sodium benzoate, polysorbate 80, Tween 20, Tween 21, Tween 40, Tween 60, Tween 61, Tween 80, Tween 81, Tween 85; and/or sodium dodecyl sulfate (SDS). In some embodiments, at least one an emulsifier a formulation of the invention may comprise, consist essentially of, or consist of polysorbate 20, sorbitan oleate, potassium sorbate, and/or sodium benzoate. In some embodiments, the at least one emulsifier of the formulation may comprise, consist essentially of, or consist of polysorbate 20. In some embodiments, the at least one emulsifier of the formulation may comprise, consist essentially of, or consist of sorbitan oleate. In some embodiments, the at least one emulsifier of the formulation may comprise, consist essentially of, or consist of polysorbate 20 and sorbitan oleate.

In some embodiments, the formulations of the invention described herein may further comprise at least one of oil of lemon eucalyptus (OLE), p-methane-3,8-diol, and/or geraniol in an amount of about 5% to about 15% by volume (e.g., about 5%, 6%, 7%, 8%, 9%, 10%, 11%, 12%, 13%, 14%, 15%, or any range or value therein; e.g., about 7% to about 12%, about 7% to about 13%, about 7% to about 14%, about 8% to about 11%, about 8% to about 12%, about 8% to about 13%, or any range or value therein). In some embodiments, the formulation may comprise geraniol in an amount of about 5% to about 15%. In some embodiments, the formulation may comprise OLE in an amount of about 5% to about 15%. In some embodiments, a formulation of the invention may comprise p-methane-3,8-diol in an amount of about 5% to about 15%. In some embodiments, a formulation of the invention may comprise geraniol and OLE in an amount of about 5% to about 15%. Thus, in exemplary embodiments, a formulation of the invention may comprise 2-undecanone in an amount of about 5% to about 50%, about 5% to about 30%, about 10% to about 20% or about 12% to about 18% by volume, or any range or value therein; at least one hydrophobic base in an amount of about 5% to about 65%, about 25% to about 40%, about 25% to about 35%, or about 27% to about 33% by volume, or any range or value therein; at least one alcohol in an amount of about 5% to about 50%, about 25% to about 40%, about 30% to about 40% or about 32% to about 38% by volume, or any range or value therein; at least one emulsifier in an amount of about 5% to about 15%, about 6% to about 13%, about 7% to about 12% or about 8% to about 12% by volume, or any range or value therein; and at least one of OLE, p-methane-3,8-diol, and/or geraniol in an amount of about 5% to about 15%, about 6% to about 13%, about 7% to about 12% or about 8% to about 12% by volume, or any range or value therein. In some embodiments, a formulation of the invention may comprise 2-undecanone in an amount of about 12% to about 18% by volume; at least one hydrophobic base in an amount of about 28% to about 33% by volume, at least one alcohol in an amount of about 30% to about 35% by volume; at least one emulsifier in an amount of about 8% to about 12% by volume; and at least one of OLE, p-methane-3,8-diol, and/or geraniol in an amount of about 8% to about 12% by volume. In some embodiments, the formulations of the invention described herein comprise OLE in an amount of about 5% to about 15%, about 8% to about 12% or about 8% to about 13%, about 9% to about 12% by volume, and any range or value therein.

In some embodiments, a formulation of the invention may be anhydrous. In some embodiments, a formulation of the invention may comprise water in an amount less than 0.25% vol/vol. In some embodiments, a formulation of the invention may comprise water in a range from about 0.25% vol./vol. to about 50% vol./vol.

The formulations of the invention may be used to repel animals including, but not limited to, insects and ticks.

Accordingly, in some embodiments, the present invention provides a method of repelling an insect or a tick, comprising applying to a subject a formulation of the invention as describe herein in an amount effective to repel an insect or a tick. In some embodiments, an effective amount of a formulation of the invention can comprise by volume about 5% to about 50%, about 5% to about 40%, about 5% to about 30%, about 5% to about 20%, about 5% to about 17.5%, about 5% to about 15%, about 10% to about 50%, about 10% to about 40%, about 10% to about 30%, about 10% to about 20%, about 10% to about 17.5%, about 12% to about 17%, about 13% to about 17%, about 14% to about 16%, about 15% to about 50%, about 15% to about 40%, about 15% to about 30%, about 15% to about 20%, about 15% to about 17.5%, about 15% to about 18%, about 20% to about 50%, about 20% to about 40%, about 20% to about 30%, about 30% to about 50%, about 30% to about 40%, about 30% to about 50%, about 5%, about 6%, about 7%, about 8%, about 9%, about 10%, about 10.5%, about 11%, about 11.5%, about 12%, about 12.5%, about 13%, about 13.5%, about 14%, about 14.5%, about 15%, about 15.5%, about 16%, about 16.5%, about 17%, about 17.5%, about 18%, about 18.5%, about 19%, about 19.5%, about 20%, about 20.5%, about 21%, about 22%, about 23%, about 24%, about 25%, about 26%, about 27%, about 28%, about 29%, about 30%, about 35%, about 40%, about 45%, or about 50% of 2-undecanone, and any range or value therein.

In some embodiments, application of a formulation of the invention may be repeated as needed. Thus, in some embodiments, the application of the formulation may be repeated every six hours, every 12 hours, every 24 hours, every other day, every three days, once a week, and the like, as needed.

In some embodiments, the formulations of the invention may be used to repel animals generally including, but not limited to, insects, ticks, spiders, hunting spiders, and/or scorpions. In some embodiments, the formulations of the invention may be used for repelling insects and ticks, wherein the insect may be, for example, a mosquito, sand fly, filth fly, chigger, flea, black fly, deer fly, horse fly, lice (e.g., body lice, head lice), roach, ant, fire ant, gnat, no-see um, and/or chigger, and the like.

The term "mosquito" as used herein refers to any type of mosquito (e.g., *Anopheles, Aedes,* and *Culex*), including but not limited to Tiger mosquitoes, *Aedes aboriginis, Aedes Aegypti, Aedes, albopictus, Aedes cantator, Aedes sierrensis, Aedes sollicitans, Aedes squamiger, Aedes sticticus, Aedes vexans, Anopheles quadrimaculatus, Culex pipiens,* and/or *Culex quinquefavciatus.*

The term "tick" as used herein refer to any type of tick, including but not limited to, deer ticks, the American dog tick (*Dermacentor variabilis*), *Ornithodoros parkeri, O. moubata,* and/or *Dermacentor andersoni.*

The term "roach" as used herein refers to any type of roach, including but not limited to the American cockroach (*Periplaneta americana*), German cockroach (*Blattella ger-*

*manica*), oriental cockroach (*Blatta orientalis*), wood cockroach (*Parcoblatta pennsylvanica*), brownbanded cockroach (*Supella longipalpa*), and/or smokybrown cockroach (*Periplaneta fuliginosa*).

In some embodiments, a formulation of the present invention may repel at least about 90% (e.g., at least about 90%, 91%, 92%, 93%, 94%, 95%, 96%, 97%, 98%, 99%, 100%, and any value or range therein) (e.g., percent repellency) of the insects and/or ticks up to about seven hours (e.g., about 1 min, 5 min, 10 min, 15 min, 20 min, 25 min, 30 min, 35 min, 40 min, 45 min, 50 min, 55 min, 1 hr, 1.1 hrs, 1.2 hrs, 1.3 hrs, 1.4 hrs, 1.5 hrs, 1.6 hrs, 1.7 hrs, 1.8 hrs, 1.9 hrs, 2 hrs, 2.1 hrs, 2.2 hrs, 2.3 hrs, 2.4 hrs, 2.5 hrs, 2.6 hrs, 2.7 hrs, 2.8 hrs, 2.9 hrs, 3 hrs, 3.1 hrs, 3.2 hrs, 3.3 hrs, 3.4 hrs, 3.5 hrs, 3.6 hrs, 3.7 hrs, 3.8 hrs, 3.9 hrs, 4 hrs, 4.1 hrs, 4.2 hrs, 4.3 hrs, 4.4 hrs, 4.5 hrs, 4.6 hrs, 4.7 hrs, 4.8 hrs, 4.9 hrs, 5 hrs, 5.1 hrs, 5.2 hrs, 5.3 hrs, 5.4 hrs, 5.5 hrs, 5.6 hrs, 5.7 hrs, 5.8 hrs, 5.9 hrs, 6 hrs, 6.5 hrs, or 7 hrs or any range or value therein) after application of the formulation to a subject. Thus, in some embodiments, a formulation of the invention may be therapeutically effective (e.g., repels about 90% to 100% of insects and ticks) for about 4 hrs to about 7 hrs or more after application to a subject. In some embodiments, a formulation of the present invention may repel at least about 90% to 100% of insects (e.g., mosquitoes) for up to about 4 hrs to about 6 hrs, about 4 hrs to about 5 hrs, about 5 hrs to about 6 hrs, or any range or value therein after application to a subject. In some embodiments, a formulation of the present invention may repel at least about 90% to 100% of ticks for up to about 5 hrs to about 7 hrs, about 5 hrs to about 8 hrs, about 6 hrs to about 7 hrs, about 6 hrs to about 8 hrs, or any range or value therein after application to a subject.

As is well understood, the repellency and duration of repellency for ticks versus insects such as mosquitoes can be different. This is due in part to the fact that odorant receptors on mosquitoes are on the antennae found on the head while those for ticks are on the tarsi (feet) on the front pair of legs. When repellency studies are conducted on mosquitoes, the mosquitoes are flying toward the human subject, detect the repellent that has evaporated from the skin of the human subject into the air some distance from the host (decreasing by 1 divided by distance squared from the repellent origin on the skin), and moving away from the repellent source (the skin). Because the mosquito is moving rapid through space in the direction of the host cues, the chemical repellency (amount of repellent in air and its repellent potency based on its unit of repellent activity per mole) must be high for repellency to occur. In the case of ticks, they are already on the host surface (skin or hair) or on host clothing and potentially moving toward a surface protected by the repellent. In this case, they are essentially walking on their olfactory surface, which comes into almost direct contact with the repellent treated surface. The repellent level in the air away from the host is not important but only that on or near the skin surface. The formulation developed in this invention was designed to provide the maximum duration of repellency for mosquitoes but also at same time provide maximum duration of repellency for ticks. Thus, in some embodiments, tick repellent duration may be longer because the tick detection and response to the repellent is at the repellent source on the skin surface and the duration of exposure to the repellent per unit time is higher since the tick is crawling at a much lower linear rate than mosquitoes that are flying toward the host. The formulation of the invention is designed to provide a longer tick duration than that for mosquitoes than current commercial repellents but at the same time provide a mosquito repellent duration competitive with current commercial mosquito repellents with comparative percentage levels of different active ingredients. Thus, in addition to insect and mosquito repellency, the present invention provides long lasting tick repellency that is advantageous in many locations where ticks may pose a greater human health risk than mosquitoes relative to the transmission of human diseases (for example, in the US and Europe).

In some embodiments, a formulation of the present invention may repel about 90% to about 100%, about 95% to about 98%, about 95% to about 99%, about 95% to about 100%, about 96% to about 98%, about 96% to about 99%, about 96% to about 100%, about 97% to about 98%, about 97% to about 99%, about 97% to about 100%, about 98% to about 99%, about 98 to about 100%, or about 99 to about 100% of the insects and/or ticks and any range or value therein for up to about seven hours after application of the formulation to a subject. In some embodiments, a formulation of the invention may repel about 95% to about 99% of the insects and ticks for up to about six hours after application of the formulation to a subject. In some embodiments, a formulation of the invention may repel about 95% to about 99% of the insects and ticks for up to about five hours after application of the formulation to a subject. In some embodiments, a formulation of the invention may repel about 98% to about 100% of insects and ticks for up to about four hours after application of the formulation to a subject. In some embodiments, a formulation of the invention may repel about 95 to about 99% of the insects and ticks for more than six hours (e.g., 6, 7, 8, 9, 10, 11, 12 hrs or more) after application of the formulation to a subject.

In some embodiments, a formulation of the invention may repel about 90% to about 100% (90%, 91%, 92%, 93%, 94%, 95%, 96%, 97%, 98%, 99%, 100%, and any range or value therein) of insects and ticks for up to about 16 weeks (e.g., about 6 hours, 7 hours, 8 hours, 9 hours, 10 hours, 11 hour, 12 hours, 18 hours, 1 day, 2 days, 3 days, 4 days, 5 days, 6 days, 1 week, 2 weeks, 3 weeks, 4 weeks, 5 weeks, 6 weeks, 7 weeks, 8 weeks, 9 weeks, 10 weeks, 11 weeks, 12 weeks, 13 weeks, 14 weeks, 15 weeks, 16 weeks or more, or any range or value therein) when applied to a substrate. Thus, in some embodiments, a formulation of the invention applied to a substrate may repel about 90% to about 100%, about 95% to about 98%, about 95% to about 99%, about 95% to about 100%, about 96% to about 98%, about 96% to about 99%, about 96% to about 100%, about 97% to about 98%, about 97% to about 99%, about 97% to about 100%, about 98% to about 99%, about 98 to about 100%, or about 99 to about 100%, or any value or range therein, of insects and/or ticks for up to about 16 weeks and possibly longer after application of the formulation to the substrate.

In some embodiments, a determination of the percent of insects or ticks repelled by the formulation of the invention can be through the use of in an "arm in the cage" test or a "filter paper" test.

Filter paper test. For the filter paper test, a 1 ft×1 ft×1 ft Plexiglas with a stocking sleeve covering one end (the one end that does not contain a Plexiglass side) (e.g., a plastic cage with four sides and a bottom and a top and one side having a stocking sleeve instead of a plastic side). The cage is filled with a sufficient number of mosquitoes (females only) so that when two grade number 1 filter paper discs (a control and a treated disc) (3.5 inches (9 cm) in diameter) are hung on the walls of the cage (on opposite sides of the cage), at least about 10 mosquitoes land per disc when the mosquitoes in the cage are excited into flight by blowing into the cage and then left undisturbed for 1 min. The assay is conducted at 25-27° C. under low light conditions (humidity is not regulated but typical lab conditions). The environmental conditions are the same throughout the studies.

For each study, one filter paper disc is treated with the repellent (500 microliters per disc) and the other with the same solvent (500 microliters per disc) used to deliver the repellent. To evenly distribute the test compound and control solvent, the filter paper in each case is treated by application of small droplets added evenly over the entire surface of the paper. Filter paper is particularly useful because it allows the droplets to spread out from the point of application by absorption and diffusion within the cellulose disc. Once the filter paper discs are treated, they are laid horizontal on a glass surface on the lab bench at room temperature of about 25° C. plus/minus 2° C. and 60% relative humidity.

At different times after treatment of the paper, the discs are hung in the cage (the control (treated with carrier solvent only) is hung first and the disc carrying the formulations of the invention are hung second. The researcher handling the discs wears powder-free nitrile examination gloves. The process of placing the discs in the cage and also blowing into the cage by the researcher causes the mosquitoes to fly. Once the researcher removes his/her hands, the number of mosquitoes landing and remaining on the disc for more than three seconds is considered not to be repelled and is counted as such. The test is run over a fixed time, e.g., about 1 min). The researcher blows into the cage one additional time at the 30 sec interval into the 1 min observation period. The discs are removed in the same order that they were placed into the test cage by the researcher who is wearing a new pair of clean gloves. Since the discs are present in the cage for no more than about 1 min, any repellent released into the air will have minimum effects on the physiology of the mosquito. Percentage repellency is calculated as the number of mosquitoes landing on the control paper minus the number of mosquitoes landing on the treatment divided by the number of mosquitoes on the control paper times 100. Since the assay takes only 1 min to conduct, multiple compounds can be tested on the same cohort of mosquitoes. Periodically, the assay is checked to determine that no positional bias is occurring in the cage (e.g., the mosquitoes may favor one filter paper versus another due to the position of one of the filter paper discs relative to a light source). Therefore, control experiments are conducted from time to time to determine if both filter paper discs untreated attract approximately the same number of mosquitoes.

Tick repellency filter paper test. Tick repellency was also determined using a filter paper test. In this case, naïve, unfed, host-seeking (as determined by raised forelegs in response to the investigator's breath), mixed sex, adult ticks were used in all trials. Adult ticks (all three species) for use in repellency studies were held in plastic vials at about 28° C., about 75% relative humidity (RH), and a photoperiod of 14 hr light: 10 h dark, including dusk and dawn periods (60 min each). Behavioral bioassays were conducted at 25_C, 65% RH, and in complete darkness (except during the approximately 5 seconds to monitor tick distribution).

Ticks were allowed to choose between a treated and untreated filter paper surface. Tests were conducted in 63.6 $cm^2$ Petri plate lids lined with two 31.8 $cm^2$ semi-circle pieces of filter paper (Whatman no. 1), each treated with the formulations of the invention and allowed to dry for 3 h at room temperature under a fume hood. At 3 h, six ticks were placed in each arena along the line formed by the junction of treated and untreated papers. Distribution of ticks was recorded every 5 min from 5 to 30 min after the introduction of ticks to test arenas. An untreated control was used to determine the distribution of ticks in the absence of a repellent. Trials were repeated six times.

Arm-in-the cage-test. For the arm in the cage test, the arm of a human subject (treated and untreated) is retained in the cage for 1 min.

A fixed amount of a test compound (e.g., formulation of the invention) (1 ml) is applied to one forearm by a researcher (the observer) who is wearing non-allergenic gloves on both hands. The observer applies the test compound using a pipette with a sterile tip and then spreads and massages the test compound into the skin from the elbow to the wrist on one arm of the subject (i.e., test arm).

At different times after application of the formulations of the invention, the subject applies a non-allergic glove to the hand on the test arm and inserts their arm into a cage of up to 200 female mosquitoes for about 1 min to about 5 min (e.g., about 1, 2, 3, 4, 5 min). A glove is used to cover the hand because the hand is not part of the assay—only the arm is used in the assay. The length of time may be varied depending on the activity of the mosquito or the mosquito species. It is known that different mosquito species and exact age of mosquito as well as unknown environmental and genetic variation in mosquitoes can affect activity (flying, landing and trying to bite). The repellency may be measured at multiple times post-treatment. Thus, the test may be run, for example, at about 4 hr, 5 hr, 6 hr, 7 hr, 8 hr, 9 hr, 10 hr, 11 hr, or 2 hr post-treatment. Between tests, the subject removes and disposes of the glove on the hand of the treated arm. For each time point, a new glove is used.

Mosquitoes that land on the skin for more than 2 seconds are counted as landing and the subject will move their arm in the cage so that the mosquito is not provided the opportunity to bite. An observer will count the number of landings.

The measurement of landings on the untreated arm (control arm) will precede the measurements made on treated arm. The subject will also have a glove on their untreated arm at each testing point, which will be replaced with a new glove for each time point.

The experiment is designed to observe about 200 or more landings on the untreated arm within one min. The mosquitoes are not allowed to take a blood meal and are prevented from doing so by shaking the arm. Any time a mosquito touches the arm, it is counted as a landing; that is, the mosquitoes do not have to land on the skin with their feet. The percentage repelled is determined by subtracting the number of insects, for example, mosquitos, that land on the treated arm from the number of mosquitos that land on the untreated arm and dividing this sum by the number of mosquitos that land on the untreated arm times 100.

The mosquitoes used in all tests are lab reared, disease free, female, and have not fed on blood of any type before the tests are conducted.

Thus, in some embodiments, a formulation of the present invention repels about 90% to about 100%, about 95% to about 98%, about 95% to about 99%, about 95% to about 100%, about 96% to about 98%, about 96% to about 99%, about 96% to about 100%, about 97% to about 98%, about 97% to about 99%, about 97% to about 100%, about 98% to about 99%, about 98 to about 100%, or about 99 to about 100% of the insects and/or ticks about four hours to about 7 hours after application of the formulation to an arm in the arm in the cage test, and any range or value therein. In some embodiments, a formulation of the invention repels about 100% of the insects and ticks about four hours after application of the formulation to an arm in an arm in the cage test. In some embodiments, a formulation of the invention repels about 99% of the insects and ticks about five hours after application of the formulation to an arm in the arm in the cage test.

Subjects to which the formulations of the present invention may be applied include human subjects and other animals (e.g., dogs, cats, horses, cattle). In some embodiments, a formulation is applied to a subject's skin and/or hair. In some embodiments, when the formulation of the invention is applied to a subject's hair the percent and time period of repellency may be greater than for application of the formulation to the subject's skin.

The formulations of the invention may be applied to subjects directly or indirectly, such as by applying the formulation to the skin or hair of the subject, or by applying the formulation to an article worn by or otherwise protecting/shielding the subject. As an example, a formulation of the invention may be applied to netting or screening that protects a subject.

A formulation of the invention may be applied to any substrate for which repelling animals, including insects and ticks is desired.

In some embodiments, a substrate may include, but is not limited to, fabrics (e.g., clothing, towels, linens, bed clothing, draperies, curtains, and the like); cotton products, wrist bands, wood products, furniture (e.g., chairs, mattresses, box springs, etc.), carpets, floors, soil and/or plants, containers, walls, base boards, air, soil, neting, paper, trash containers, dumps, tents, paint, etc.

Application to subjects or substrates may be carried out by any means that transfers the formulation to the subject or substrate, including but not limited to, spraying, misting, spreading, dusting, pouring, dipping, sprinkling, rubbing, fumigating, rolling, atomizing, and the like.

The formulations of the invention may be formulated in a variety of ways, including but not limited to liquids, powders, solids, emulsions, mousses, granules, dusts, a suspension, an aerosol (e.g., powdered, liquid), a shampoo, a conditioner, a creme rinse, a mousse, a foam, a lotion, a gel, a powder (e.g., a dry shampoo), a shampoo, a conditioner, a creme rinse, a paste, or an ointment. The formulations of the invention may be incorporated into or coated onto textiles, plastics, latex, rubber, cellulose, wicks, candles, paint, heat and air dispensers.

The invention will now be described with reference to the following examples. It should be appreciated that these examples are not intended to limit the scope of the claims to the invention, but are rather intended to be exemplary of certain embodiments. Any variations in the exemplified methods that occur to the skilled artisan are intended to fall within the scope of the invention.

EXAMPLES

Example 1

Procedures for testing repellent activity against the yellow fever mosquito (*Aedes aegypti*), the Asian tiger mosquito (*Aedes albopictus*), and *Anopheles gambiae* (a malaria vector).

A fixed amount of repellent (1 ml) is applied to one forearm of the subject by a researcher (the observer) wearing non-allergenic gloves on both hands. The observer will apply the repellent using a Gilson pipetter with a sterile tip and then spread and massage the repellent into the skin using the pipette tip as a spreading device spreading the repellent from the elbow to the wrist on one arm of the subject (the test arm).

At different times after application of the repellent up to 12 h, the subject will apply a non-allergic glove to the hand on the test arm and then insert their arm into a cage of 200 female mosquitoes for 1-5 min. The length of time might be different depending on the activity of the mosquito or species; mosquito species and exact age of mosquito as well as unknown environmental and genetic variation in mosquitoes can affect activity (flying, landing and trying to bite). Post treatment measurements are made at 4, 5, 6, 7 and 8 h and possibly 12 h if repellency remains greater than 70% at 8 h. Between tests, the subjects remove and dispose of their glove on the hand of the treated arm. A new glove is used for each time point of testing.

Mosquitoes that land on the skin for more than 1 sec. will be considered ready to bite and the subject will move their arm in the cage so the mosquito leaves the skin to avoid actual biting of the subject. An observer will count the number of landings.

The subject has a glove on their untreated or control arm at each testing point. The insertion of the untreated arm will precede the treated arm and number of landings recorded as described. The glove is removed from the untreated arm immediately after removal from the cage as also will be the case for the treated arm. A new glove is used for each time point.

The study is stopped when percentage repellency is less than 50%. Percentage repellency is calculated based on the number of mosquitoes landing on the untreated arm minus the number landing on the treated arm divided by the number landing on the untreated arm times 100.

The mosquitoes used in the study are lab reared, disease free, adult female, and have not fed on blood of any type before the tests are conducted. Since the mosquitoes are not allowed to bite the subjects, there is also no chance for reactions to mosquito bites.

The mosquitoes are killed by freezing after the testing, autoclaved and disposed in the regular trash.

Example 2

A combination of 2-undecanone with soybean oil and geraniol in the ranges tested provided an increased repellency over 2-undecanone in cotton seed soil and over 2-undecanone in soybean oil using polar solvents like water. In Table 1, the four component formulations were problematic for the following reasons: (i) the product separated into multiple phases when allowed to stand at room temperature; (ii) the product needed to be shaken to reform an emulsion before use (to re-establish a single phase) and as a result of (ii), the product (a) was predicted to have delivery issues as a commercial repellent possibly causing harm to users from the accidental application of neat ingredients and (b) would require specialized development of a new delivery system to apply the repellent because of the chemical degradation of the container parts by the separated 2-undecanone and/or geraniol (which adds to the cost of product development for the delivery system, potentially would result in development challenges that might not be solvable (including issues with having to shake the bottle before use) which is not consistent with industry standards for these type of products); further, the product (iii) was too viscous to be applied by aerosol; (iv) had a poor skin feel—felt oily and was uncomfortable to human test subjects; (v) had a high rate of contact transfer from skin to other materials like clothing that might affect product efficacy for mosquito and tick protection; (vi) did not achieve adequate mosquito repellency 100% at 5 h post treatment; (vii) had a strong, pungent smell which would not be desirable to users and hard to mask with other scents to make a final product with an acceptable odor; and (viii) produced undesirable skin reactions (all in part or whole from list given). Thus, the formulations in Table 1 demonstrated that alcohol could be used to decrease soybean oil content and therefore, improve feel on skin. However, these formulations achieved a repellency similar to that of the plant-based oil only.

TABLE 1

Results of repellency tests for selected formulations

| Formula Name | Active ingredients | 1 hr | 2 hr | 3 hr | 4 hr | 6 hr | 8 hr |
|---|---|---|---|---|---|---|---|
| | Insect *Aedes Aegypti* | | | | | | |
| Soybean 1 | 8% undecanone, 5% geraniol, 35% soybean oil, 52% isopropyl alcohol | | | | *88.5% repellent | | |
| Soybean 2 | 8% undecanone, 5% geraniol, 50% soybean oil, 37% isopropyl alcohol | | | | *94.5% repellent | | |
| Soybean 3 | 8% undecanone, 5% geraniol, 65% soybean oil, 22% isopropyl alcohol | | | | | *100% repellent | |
| Soybean 4 | 8% undecanone, 5% geraniol, 87% soybean oil | | | | | *100% repellent | |

*200 mosquitoes in the cage, calculation of percentage repellency based on number of landings on treated arm versus untreated arm (see example 1 for calculation details); undecanone = 2-undecanone

Example 3

Addition of alcohol breaks the heavy oily feel of the formulation and reduces the ease of transfer of the repellent from treated skin to items like clothing that might come into contact with treated skin. While, Table 2 included a formulation with a different alcohol to plant-based oil concentration than those in Table 1, the negative aspects of the four component system discussed above in Example 2 were still present, including the separation of the formulation into different phases when left standing. Further, a higher level of plant-based oil was still needed to achieve the desired repellency; however, this higher amount of oil creates the undesirable greasy/oily feel discussed above. Thus, the combined data from Tables 1-2, helped establish the relationship between alcohol level and repellency in a dose dependent manner and assisted in moving closer to an alcohol/oil ratio that would provide 100% repellency and the best feel on the skin.

TABLE 2

Results of repellency tests for selected formulations

| Formula Name | Active, ingredients | 1 hr | 2 hr | 3 hr | 4 hr | 6 hr | 8 hr |
|---|---|---|---|---|---|---|---|
| | Insect *Aedes aegypti* | | | | | | |
| Soybean 5 | 8% undecanone, 5% geraniol, 25% soybean oil, 62% isopropyl alcohol | | | | *73.5% repellent | | |
| Soybean 1 | 8% undecanone, 5% geraniol, 35% soybean oil, 52% isopropyl alcohol | | | | *88.5% repellent | | |
| Soybean 2 | 8% undecanone, 5% geraniol, 50% soybean oil, 37% isopropyl alcohol | | | | *94.5% repellent | | |
| Soybean 3 | 8% undecanone, 5% geraniol, 65% soybean oil, 22% isopropyl alcohol | | | | | *100% repellent | |
| Soybean 4 | 8% undecanone, 5% geraniol, 87% soybean oil | | | | | *100% repellent | |

*200 mosquitoes in the cage, calculation of percentage repellency based on number of landings on treated arm versus untreated arm (see example 1 for calculation details); undecanone = 2-undecanone.

Example 4

The addition of specific emulsifiers prevented separation into multiple phases and improved the feel on the skin and the reduced transfer rates were maintained. However, the repellency of the formulations was reduced (Table 3). Also, the other negative characteristics (see Example 2, above) were still present. These data demonstrate the use of commercial grade denatured alcohol (ethanol) instead of isopropyl alcohol in the formulations. Based on dose response data in Table 1 and Table 2, it is believed that the reduced repellency of the formulation was a result of reducing the percentage soybean oil.

TABLE 3

Results of repellency tests for selected formulations

| Formula Name | Active, ingredients | Control | 4.0 hr | % repellency |
|---|---|---|---|---|
| Soybean 6 | 15% 2-undecanone, 5% polysorbate 20, 20% soybean oil, 55% denatured alcohol, 5% geraniol | 205 landing/min | 29 landing/min | *86% |
| Soybean 6 | 15% 2-undecanone, 5% polysorbate 20, 20% soybean oil, 55% denatured alcohol, 5% geraniol | 240 landing/min | 139 landing/min | *42% |

*200 mosquitoes in the cage, calculation of percentage repellency based on number of landings on treated arm versus untreated arm (see example 1 for calculation details).

Example 5

Further experiments adjusting oil to alcohol ratio was needed to improve the desired repellency, maintain positive skin feel, to minimize accidental transfer from treated skin, to allow a stable monophasic system, and to eliminate issues associated with delivery of the repellent (issues as discussed in Example 2, above), see Table 4.

TABLE 4

Results of repellency tests for selected formulations

| Formula Name | Active, ingredients | Control | 4.0 hr | % repellency |
|---|---|---|---|---|
| Soybean 7 | 15% 2-undecanone, 5% polysorbate 20, 30% soybean oil, 40% denatured alcohol, 5% geraniol, 5% sorbitan oleate | 372 landing/min | 23 landing/min | 94% |
| Soybean 7 | 15% 2-undecanone, 5% polysorbate 20, 30% soybean oil, 40% denatured alcohol, 5% geraniol, 5% sorbitan oleate | 292 landing/min | 45 landing/min | 85% |

*200 mosquitoes in the cage, calculation of percentage repellency based on number of landings on treated arm versus untreated arm (see example 1 for calculation details).

Example 6

By further reducing the percentage of alcohol and adjusting other components, a desired repellency of over 95% was achieved in combination with a stable monophasic system, which addressed each of the issues raised in Example 2 (above).

The formulations of the invention are advantageous in that they do not easily rub off the skin and do not result in irritation to the skin when applied. Additionally, the formulations of this invention have an excellent feel and better activity than other known insect repellent formulations (e.g., BioUD, as shown in "arm in cage" studies). Thus, for example, as reported in Witting-Bissinger et al. (J. Med. Entomol., 45:891-898 (2008)) a commercial composition of 7.75% 2-undecanone (BioUD) had a mosquito repellency of about 70% at 5 hours post application as compared to 99% at 5 hours for the formulations of the present invention. Notably, in Witting-Bissinger et al., the cages contained 50 mosquitoes as compared to 200 in the cages used to test the formulations of the present invention. Thus, the formulations provided better repellency under greater biting pressure.

Example 7

Additional Testing of the Formulations of the Invention

In this example, a formulation comprising 15% 2-undecanone, soybean oil, polysorbate 20, sorbitan oleate, oil of lemon eucalyptus and denatured alcohol was tested.

A colony of *Aedes aegypti* (L.) mosquitoes used in the bioassay was established from field-collected eggs from New Orleans, LA., in 2003. At 6 to 8 month intervals, adults reared from field-collected eggs were added to the mosquito colony to sustain genetic diversity. Larvae were reared as described by Trexler et al. (2003). Mosquito colonies were maintained in the Dearstyne Entomology laboratory at 28° C., 75% relative humidity, and a photoperiod of 14:10 (L:D), including two twilight periods (60 min each). Adult females used in the experiments were provided 10% sucrose solution ad libitum and were never allowed to blood feed.

The testing procedures were as follows. The test area was the surface of the arm from the elbow to the wrist (hands were covered with non-allergenic gloves). Test areas were washed with soap and water then swabbed with 70% ethanol before application of each repellent. The ethanol was allowed to evaporate completely before repellent treatments. Control arms were cleansed in the same manner. For all studies on human skin, repellents were applied at a rate of 1 ml/600 cm2. For each test, mated nulliparous host-seeking (non-blood fed) female mosquitoes aged between 6 and 18 d were released into a square 27,000 cm$^3$ Plexiglas cage with a sleeved opening on one side for insertion of a subject's arm. The cage contained only the test mosquitoes during the testing period (no nectar or water source).

For the arm in cage test, the arm of the human subject (treated versus untreated control) was inserted into the cage for 1 minute. Tests were conducted at 25° C., 60-70% relative humidity and under florescence laboratory lighting. A fixed amount of the test compound (1 ml) was applied to one forearm by a researcher (the observer) who was wearing non-allergenic gloves on both hands. The observer applied the test compound using a P1000 Pipetteman with a sterile tip and then spread (and massaged into the skin using the pipette tip) from the elbow to the wrist and one arm of the subject (i.e., the treatment arm). Prior to the study, the pipette calibration was validated by transferring distilled water to an analytical balance (+0.0001 grams) and was within the standard accuracy and precision of the manufacturer (<2% error). Nothing was applied to the other arm of the subject which was the control arm.

At different times after application of the formulation, the subject applied a non-allergic glove to the hand on the control and test arm and just afterward, inserted the arm into a cage (control arm first and then immediately the treatment arm); the cage contained up to 200 female mosquitoes. Each arm was inserted for 1 minute. The repellency was measured at multiple times post-treatment. Bioassays were conducted for each subject on the same cage of mosquitoes; different cages for different subjects. The time between bioassays was no shorter than 30 minutes and typically at least an hour. Insertion of the control versus treated arm did not cause a reduction in landing counts on the control arm at the different times tested. Between tests, the subject removed and disposed of the glove. For each time point, a new glove was used. The purpose of the glove was to prevent mosquito biting the hand, and no mosquito blood feeding on the hand was reported for any bioassay. The subject with a treated arm was encouraged to sit quietly and minimize physical activity.

Mosquitoes that touch the skin only are counted as landing; the mosquitoes do not have to stand on the skin with their legs to be considered a landing. When a landing was noticed where the mosquito is standing on the skin, the subject moved their arm in the cage in a rapid back and forth motion to prevent mosquito biting and blood feeding. No biting or blood feeding was noted in any of the bioassays. The observer counted the number of landings using a hand held numerical counter. The observer was positioned on the opposite side of the cage from the subject to best observe landings. The measurement of landings on the untreated arm (the control arm) preceded the measurements made on the treated arm. The mosquito density was adjusted to achieve 200 or more landings on the untreated arm within one minute.

Percentage repellency provided was calculated as follows: (control landings treatment landings/control landings)×100.

The formulation tested in each of Tables 5-8, below, comprised 15% undecanone, soybean oil, polysorbate 20, sorbitan oleate, oil of lemon eucalyptus and denatured alcohol.

TABLE 5

| | | At 4 hours | | At 5 hours | |
|---|---|---|---|---|---|
| Subject | Control (land*/in) | Treatment (land/min) | % Repellency | Treatment (land/min) | % Repellency |
| 1 | 320 | 19 | 94 | | |
| 2 | 256 | 16 | 94 | | |

*land = landings

TABLE 6

| | | At 4 hours | | At 5 hours | |
|---|---|---|---|---|---|
| Subject | Control (land*/in) | Treatment (land/min) | % Repellency | Treatment (land/min) | % Repellency |
| 1 | 312 | 1 | 99.7 | | |
| 2 | 296 | 0 | 100 | | |

*land = landings

TABLE 7

| | | At 4 hours | | At 5 hours | |
|---|---|---|---|---|---|
| Subject | Control (land*/in) | Treatment (land/min) | % Repellency | Treatment (land/min) | % Repellency |
| 1 | 156 | 2 | 98 | | |
| 2 | 204 | 5 | 98 | | |

*land = landings

TABLE 8

| | | At 4 hours | | At 5 hours | |
|---|---|---|---|---|---|
| Subject | Control (land*/in) | Treatment (land/min) | % Repellency | Treatment (land/min) | % Repellency |
| 1 | 216 | 3 | 99 | 2 | 99 |
| 2 | 468 | 3 | 99 | 4 | 99 |

*land = landings

The formulation of the invention was 99% effective for at least 5 hours in preventing mosquitoes even touching the subject's arm. In other trials with the formulation, the average repellency at 4 h was 95.3% (typical range 94 to 100%; Tables 5 to 7).

Example 8

The effect of the new formulations on the foraging behavior of ticks and mosquitoes.

In this example, a formulation comprising 2-undecanone, soybean oil, polysorbate 20, sorbitan oleate, oil of lemon eucalyptus and denatured alcohol was tested.

The objective of these laboratory studies was to quantify foraging behavior of mosquitoes and ticks in response to human study participants that were treated with the formulations of the invention.

In one study, mosquito landings were recorded on the untreated versus repellent-treated arms of human subjects. Exposures to mosquitos were made at 30-minute intervals, with each exposure lasting for 1 minute for treated arms and for 20 seconds for untreated control arms (to limit the number of bites received). Control exposures served to verify biting avidity of mosquitoes during the study. Complete Protection Time was defined as the time from application of the test material to a subject's skin until the exposure in which the first landing with intent to bite occurred that was followed by another landing with intent to bite within the same or the next exposure interval.

In a second study, crossings of individual ticks on untreated and repellent-treated arms of human subjects were recorded. Fresh ticks were first selected for avidity by initially checking that the ticks would traverse a specified distance on each subject's untreated arm within a three-minute period. "Qualifying" ticks were those that walked upward on an untreated arm, toward the elbow. Any tick that qualified was then moved to that subject's treated arm in order to challenge the repellent. Complete Protection Time was defined as the time from application until the exposure in which there was a crossing confirmed by another crossing within 30 minutes (First Confirmed Crossing). The earlier of these crossings was considered the end of Complete Protection.

Each study included four subjects. In the case of the study of the foraging behavior of mosquitoes, the negative control was the untreated arm of one subject. In the case of the study of the foraging behavior of ticks, the negative control was the untreated arm of each of the four subjects.

To minimize the chances of any potential substances (e.g., cosmetic products) on subject skin interfering with the test, each subject began by washing both arms with fragrance-free soap, rinsing with water, then washing both arms again with 70% ethyl alcohol in water, and finally rinsing with water. Arms were dried with plain paper towels prior to repellent applications. The topical repellent formulation of the invention was applied at a dosing rate of approximately of 1 mL per 600 cm2 of skin surface area. Accordingly, the total amount of material applied to each subject was determined by the surface area of the forearms of each subject.
Mosquito Testing.

Mosquito testing was against adult female *Aedes aegypti* from laboratory-reared disease-free populations.

The formulation tested in this example comprised 2-undecanone, soybean oil, polysorbate 20, sorbitan oleate, oil of lemon eucalyptus and denatured alcohol (e.g., "the test material"). The test material was applied from the wrist to the elbow of each participant using a 1 mL syringe. Specifically, the repellent was distributed onto the skin in drops and lines, and then spread with two fingertips of one hand until complete and even coverage was observed. For each application, fresh gloves were used.

Approximately 100 laboratory-reared adult female mosquitoes were used to challenge the repellent in each exposure interval. Prior to testing, mosquitoes were supplied with feeding bottles of 10% sucrose in water. Feeding bottles were removed 12 hours prior to testing in order to increase their foraging avidity. Mosquitoes were held in 12-inch (~30 cm) cubic screened cages. During each exposure period, repellents were challenged in sequence in a single cage of mosquitoes. At 30-minute intervals beginning shortly after repellents were applied, each participant began exposures by inserting a forearm into a cage. For treated arms, exposures were for one minute, and for untreated control arms the exposure was for 20 seconds. Two observers counted mosquito landings during each exposure. Control exposures served to verify avidity in mosquitoes. A 20 second exposure of untreated arms to the mosquitoes was estimated to represent about 50% of the number that would be expected to land in a full minute exposure.

Repellent failure was scored independently for each subject, and defined as the time after application at which the first bite occurred that was followed by another bite within that or either of the next two intervals (time of First Confirmed Bite (FCB)).
Tick Testing.

Tick tests used nymphal Deer Ticks, *Ixodes scapularis* from laboratory reared, disease-free populations and the formulation tested comprised 2-undecanone, soybean oil, polysorbate 20, sorbitan oleate, oil of lemon eucalyptus and denatured alcohol.

A single nymphal Deer Tick was used to challenge the repellent formulation of the invention during each exposure interval. Ticks were held in glass vials surrounded by water to contain them during the test, and fresh ticks were used for each challenge with a formulation of the invention. The formulation was challenged simultaneously in all subjects in 3 minute exposures commencing every 30 minutes beginning from the application of the test material.

Subjects manipulated ticks with small artist's paintbrushes, first placing them on an untreated arm to insure avid questing behavior in the absence of repellent, then placing them on the treated arm. In this way each subject served as their own negative control. Only avid ('qualified') ticks were used to challenge repellent formulations of the invention.

Figure 1:
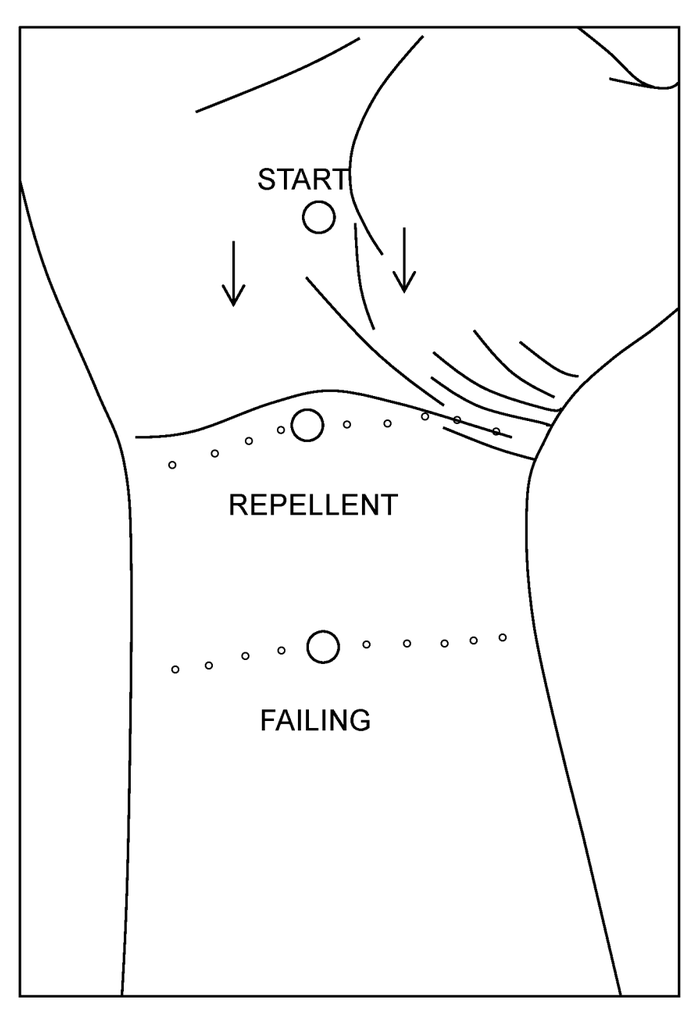
FIG. 1 provides photograph of a representative arm with descriptive labels to show the set-up for testing tick foraging. The labels were not present during actual testing.

Crossings were measured by placing three dots on each subject's arms, 3-cm distant from one another, in a straight line (see, FIG. 1). For a treated arm, repellent was present above the middle dot, and failure was defined as crossing 3-cm into the treated area, past the third dot. An exposure interval where a tick did continue past this third dot was scored as a crossing, and repellent was considered no longer effective at that point if that crossing was confirmed by another within that or either of the next two intervals (First Confirmed Crossing, or FCC). For controls, the same crossing criterion was used to insure tick avidity, but no treatment (i.e., no repellent was present).

Repellent failure was scored independently for each subject, and defined as the time after application in which the first crossing occurred that was followed by another crossing in the next two intervals (First Confirmed Crossing).
Results
Mosquitoes Of the four test participants, two received confirming landing with intent to bite, for Complete Protection Time (CPT) of 3 and 5 hours, respectively. The remaining two subjects withdrew voluntarily. One of the subjects that withdrew voluntarily received a single landing with intent to bite at 2 hours and withdrew voluntarily at 4.5 hours and the other received a single landing with intent to bite at 6 hours and then withdrew. With two subjects experiencing repellent failures and two withdrawing before failure, only a conservative mean CPT value can be calculated. Mean±sd CPT was approximately 4.63±1.25 hours.

While exposures were initiated at 30-minute intervals, they were generally 5-10 min past the exact ½ hour intervals post application. Hence each of the hour values below understates protection duration by about 5-10 minutes. Accounting for minor exposure delays in each period increases the conservative mean of approximately 4.75 hours. Accepting that the subjects who withdrew could not have received confirming landing with intent to bite until at least 30 minutes after their withdrawal times, the minimum reasonable mean CPT calculation is probably about 5.0 hours.
Ticks None of the four subjects experienced any crossings on the treated arms. All subjects withdrew after several hours of testing confirmed to evident prolonged complete protection. Two subject withdrew after 6.5 hours, and the other two withdrew after 7 hours. The mean±sd CPT against ticks was 6.75±0.25.

Against ticks, no subjects tested their treatment all the way to failure. Thus, longer protection times could have been recorded had all subjects done so. Nonetheless, the average protection time among the data gathered was reasonably long and showed no signs of failure.

In conclusion, the topical repellent formulation of the invention was effective against *Aedes aegypti* mosquitoes for about 5 hours, and against *Ixodes scapularis* ticks for at least a few additional hours more than observed for the mosquitoes. We regard this duration of repellency against ticks to be strong.

Example 9

Animal Toxicity Tests

Any formulation for use as a repellant in addition to providing repellency at the same time has to be compatible to use on humans without adverse effects including not only skin but clothing, hair and accidental application to eyes and other sensitive surfaces on the body. It must also have no toxic effects and also have an acceptable relative to smell and feel on the skin and also relative to retention on treated surfaces with resistance to removal from typical rubbing that might occur to skin on different parts of the body. The formulations of the present invention were tested to show that they meet all of these criteria.

Test I. Skin Sensitization Study in Guinea Pigs

A formulation of the invention comprising 2-undecanone, soybean oil, polysorbate 20, sorbitan oleate, oil of lemon eucalyptus and denatured alcohol was tested for dermal sensitization potential utilizing a Buehler Technique Guinea Pig Sensitization Protocol. The test substance was evaluated for sensitization potential by applying 0.4 ml at a 100% concentration directly into Hilltop Chambers® and applying them to the clipped left shoulder of twenty albino guinea pigs in the following manner: The animals were held gently, and the chambers were applied as quickly as possible to the clipped left shoulder. The chambers were secured with Micropore tape and further secured with Kendall adhesive tape. Approximately six hours later, the tape and chambers were removed. Two additional induction doses were conducted following the same procedure, at weekly intervals.

Two weeks after the final application the animals received a topical primary challenge dose (6 hour contact) of the formulation at 100% concentration, on a naive site located on the right shoulder. Animals were scored for irritation at 24 and 48 hours after initiation of the primary challenge application.

Ten guinea pigs served as a naive control group, and remained untreated through the induction phase. Six naive control animals received only the primary challenge dose, at a 100% concentration. The four remaining guinea pigs were designated for a re-challenge, if necessary.

Following primary challenge with the formulation at 100% concentration, the incidence of grade 1 response or greater in the test group (0 of 20) was compared to that of the naive control group (0 of 6). The incidence and severity of these responses were not significantly greater than those produced by the naive control group indicating that sensitization had not been induced.

Test II. Acute Inhalation Toxicity Study in Rats

A formulation of the invention comprising 2-undecanone, soybean oil, polysorbate 20, sorbitan oleate, oil of lemon eucalyptus and denatured alcohol was tested for acute inhalation toxicity in accordance with OPPTS Guideline 870.1300 and OECD Guideline 403 at a targeted level of 2.0 mg/L of air by exposing five male and five female rats for a four hour period. The actual gravimetric concentration of the study was 2.33 mg/L of air. No mortality was observed during the 14 day observation period. The inhalation LC50 of the formulation was found to be greater than 2.33 mg/L of air for a 4 hour period. In accordance with the OPPTS Guidelines, formulation of the invention would be classified as EPA Toxicity Category IV for acute inhalation toxicity.

Test III. Acute Dermal Toxicity Study in Rabbits

A formulation of the invention comprising 2-undecanone, soybean oil, polysorbate 20, sorbitan oleate, oil of lemon eucalyptus and denatured alcohol was tested for acute dermal toxicity according to OPPTS, OECD Guidelines. The formulation, an amber liquid, was administered by dermal application at a dose of 5.0 g/kg body weight to five male and five female rabbits. No mortality occurred during the 14 day observation period. The acute dermal LD50 was found to be greater than 5.0 g/kg body weight. The formulation of the invention would be classified as Toxicity Category IV for dermal toxicity Test IV. Acute Oral Toxicity Study in Rats A formulation of the invention comprising 2-undecanone, soybean oil, polysorbate 20, sorbitan oleate, oil of lemon eucalyptus and denatured alcohol was tested for acute oral toxicity in accordance with OPPTS 870.1100 and OECD 425 Guidelines. The formulation, an amber liquid, was administered by oral gavage at a 5000 mg/kg body weight limit dose level, according to the Agency's Up and Down Procedure to female rats. The acute oral LD50 was determined to be greater than 5000 mg/kg body weight. Therefore, in accordance with OPPTS Guidelines, the formulation of the invention meets the requirements for EPA Toxicity Category IV for acute oral toxicity.

Test V. Acute Dermal Irritation Study in Rabbits

A formulation of the invention comprising 2-undecanone, soybean oil, polysorbate 20, sorbitan oleate, oil of lemon eucalyptus and denatured alcohol was tested for primary dermal irritation in accordance with OPPTS and OECD Guidelines. The formulation, an amber liquid, was applied at a dose of 0.5 ml to an unabraded site on a clipped area of each of three albino rabbits. The application sites were graded for indication of skin reactions at 0.5, 24, 48, 72, 168 and 336 hours after test substance removal. There were mild skin irritation reactions in all of the test subjects which cleared by the 336 hour observation. The maximum skin irritation score was 3.0 at the 48 hour observation. The primary skin irritation index was calculated to be 2.58. In accordance with the OPPTS Guidelines, the formulation of the invention would be classified as EPA Toxicity Category IV for dermal effects.

Test VI. Acute Eye Irritation Study in Rabbits

A formulation of the invention comprising 2-undecanone, soybean oil, polysorbate 20, sorbitan oleate, oil of lemon eucalyptus and denatured alcohol was tested for eye irritation in accordance with OPPTS and OECD Guidelines. The formulation, an amber liquid, was administered into one eye of each of three albino rabbits. The eyes were observed and scored at 1, 24, 48, 72 and 168 hours. There was moderate eye irritation observed in all of the three test subjects which cleared by the 168 hour observation. The maximum group mean score was 14.67/110.0 at the 24 hour observation. In accordance with the OPPTS Guidelines, the formulation of the invention would be classified as Toxicity Category III.

Example 10

Human Repeat Insult Patch Tests for Skin Irritation and Skin Sensitization Evaluation To determine the irritation and sensitization (contact allergy) potential of a test material after repeated application to the skin of human subjects three studies were conducted using the formulations of the invention comprising 2-undecanone, soybean oil, polysorbate 20, sorbitan oleate, oil of lemon eucalyptus and denatured alcohol (e.g., test materials).

Procedures:

Test materials to be tested under occlusive conditions were placed on an 8-millimeter aluminum Finn Chamber® (Epitest Ltd. Oy, Tuusula, Finland) supported on Scanpor® Tape (Norgesplaster A/S, Kristiansand, Norway) or an 8 mm filter paper coated aluminum Finn Chamber® AQUA supported on a thin flexible transparent polyurethane rectangular film coated on one side with a medical grade acrylic adhesive, consistent with adhesive used in state-of the-art hypoallergenic surgical tapes or a 7 mm IQ-ULTRA® closed cell system which is made of additive-free polyethylene plastic foam with a filter paper incorporated (It is supplied in units of 10 chambers on a hypoallergenic nonwoven adhesive tape; the width of the tape is 52 mm and the length is 118 mm) or other equivalents. Materials to be tested under semi-occlusive conditions were placed on a test strip with a Rayon/Polypropylene pad or on a 7.5 mm filter paper disc affixed to a strip of hypoallergenic tape (Johnson & Johnson 1 inch First Aid Cloth Tape).

Test materials to be tested in an open patch were applied and rubbed directly onto the back of the subject. Approximately 0.02-0.05 mL (in case of liquids) and/or 0.02-0.05 gm (in case of solids) of the test material was used for the studies. Liquid test material was dispensed on a 7.5 mm paper disk, which fit in the Finn Chamber.

Subjects were requested to bathe or wash as usual before arrival at the facility. Patches containing the test material were then affixed directly to the skin of the intrascapular regions of the back, to the right or left of the midline and subjects were dismissed with instructions not to wet or expose the test area to direct sunlight. Patches remained in place for 48 hours after the first application. Subjects were instructed not to remove the patches prior to their 48 hour scheduled visit. Thereafter, subjects were instructed to remove patches 24 hours after application for the remainder of the study.

This procedure was repeated until a series of nine (9) consecutive, 24-hour exposures had been made three (3) times a week for three (3) consecutive weeks. Prior to each reapplication, the test sites were evaluated by trained laboratory personnel. Following a 10-14 day rest period a retest/challenge dose was applied once to a previously unexposed test site.

Test sites were evaluated by trained laboratory personnel 48 and 96 hours after application.

In the event of an adverse reaction, the area of erythema and edema were measured. Edema was estimated by the evaluation of the skin with respect to the contour of the unaffected normal skin. Subjects were instructed to report any delayed reactions that might occur after the final reading.

Scoring scale and definition of symbols shown below are based on the scoring scheme according to the International Contact Dermatitis Research Group scoring scale [Rietschel, R. L., Fowler, J. F., Ed., Fisher's Contact Dermatitis (fourth ed.). Baltimore, Williams & Wilkins, 1995] listed below:
  0 no reaction (negative)
  1 erythema throughout at least ¾ of patch area
  2 erythema and induration throughout at least ¾ of patch area
  3 erythema, induration and vesicles
  4 erythema, induration and bullae
  D Site discontinued
  Dc Subject discontinued voluntarily
  DcI Subject discontinued per Investigator Study I.

Formulation: 2-undecanone, soybean oil, polysorbate 20, sorbitan oleate, oil of lemon eucalyptus and denatured alcohol.

Population Demographics

| | |
|---|---|
| Number of subjects enrolled | 66 |
| Number of subjects completing study | 59 |
| Age Range | 19-65 |
| Sex | |
| Male | 4 |
| Female | 55 |
| Fitzpatrick Skin Type* | |
| 1 - always burn, does not tan | 0 |
| 2 - burn easily, tan slightly | 22 |
| 3 - burn moderately, tan progressively | 8 |
| 4 - burn a little, always tan | 17 |
| 5 - rarely burn, tan intensely | 12 |
| 6 - never burn, tan very intensely | 0 |

*Agache P., Hubert P.. Measuring the skin. Springer-Verlag Berlin Heidelberg, 2004, (p. 473, table 48.1)

Results: No adverse reactions of any kind were reported during the course of this study. There were thirty-five (35) subjects with a Grade 1 reaction and four (4) subjects with a Grade 1 delayed reaction to the positive control (2.0% Sodium Lauryl Sulfate Solution).

No subjects showed any signs of reaction to the negative control (DI Water).

Study II.

Formulation: 2-undecanone, soybean oil, polysorbate 20, sorbitan oleate, oil of lemon eucalyptus and denatured alcohol.

Population Demographics:

| | |
|---|---|
| Number of subjects enrolled | 55 |
| Number of subjects completing study | 55 |
| Age Range | 18-64 |
| Sex | |
| Male | 9 |
| Female | 46 |
| Fitzpatrick Skin Type* | |
| 1 - always burn, does not tan | 0 |
| 2 - burn easily, tan slightly | 0 |
| 3 - burn moderately, tan | 55 |
| 4 - burn a little, always tan | 0 |
| 5 - rarely burn, tan intensely | 0 |
| 6 - never burn, tan very intensely | 0 |

*Agache P., Hubert P.. Measuring the skin. Springer-Verlag Berlin Heidelberg, 2004, (p. 473, table 48.1)

Results: No adverse reactions of any kind were reported during the course of this study. There were Ten (10) subjects with a Grade 1 reaction to the positive control (2.0% Sodium Lauryl Sulfate Solution). No subjects showed any signs of reaction to the negative control (DI Water).

Study III

Formulation: 2-undecanone, soybean oil, polysorbate 20, sorbitan oleate, oil of lemon eucalyptus and denatured alcohol.

Population Demographics:

| | |
|---|---|
| Number of subjects enrolled | 55 |
| Number of subjects completing study | 54 |
| Age Range | 19-63 |
| Sex | |
| Male | 5 |
| Female | 49 |
| Fitzpatrick Skin Type* | |
| 1 - always burn, does not tan | 0 |
| 2 - burn easily, tan slightly | 0 |
| 3 - burn moderately, tan progressively | 54 |

| | |
|---|---|
| 4 - burn a little, always tan | 0 |
| 5 - rarely burn, tan intensely | 0 |
| 6 - never burn, tan very intensely | 0 |

*Agache P., Hubert P.. *Measuring the skin*. Springer-Verlag Berlin Heidelberg, 2004, (p. 473, table 48.1)

Results: No adverse reactions of any kind were reported during the course of this study. Two subjects showed Grade 1 and two subjects showed Grade 2 reaction to the positive control (2.0% Sodium Lauryl Sulfate Solution). No subjects showed any signs of reaction to the negative control (DI Water).

The foregoing is illustrative of the present invention, and is not to be construed as limiting thereof. The invention is defined by the following claims, with equivalents of the claims to be included therein.

That which is claimed is:

1. A monophasic formulation comprising:
   2-undecanone in an amount of about 5% to about 20% by volume in the formulation;
   at least one hydrophobic base in an amount of about 20% to about 65% by volume in the formulation;
   at least one alcohol in an amount of about 5% to about 30% by volume in the formulation; and
   at least one emulsifier in an amount of about 5% to about 15% by volume in the formulation.

2. The monophasic formulation of claim 1, further comprising at least one of oil of lemon *eucalyptus* (OLE), p-menthane-3,8-diol, and/or geraniol, optionally in an amount of about 5% to about 15%.

3. The monophasic formulation of claim 1, wherein the at least one hydrophobic base is a branched hydrocarbon, an unbranched hydrocarbon, a hydrophobic polymer, a fatty acid, a fatty acid ester, a monoglyceride, a diglyceride, and/or a triglyceride.

4. The monophasic formulation of claim 1, wherein the at least one hydrophobic base is a plant-based oil, optionally wherein the plant-based oil is avocado oil, borage oil, canola (rapeseed) oil, castor oil, chamomile oil, coconut oil, corn oil, cottonseed oil, rapeseed oil, evening primrose oil, safflower oil, sunflower oil, soybean oil, sweet almond, palm oil, palm kernel oil, *arctium lappa* seed oil, sesame oil, borgo officialis seed oil, *brassica campestris* oleifera oil, brevoortia oil, bubulum oil, cistus ladaniferus oil, *elaeis Guineensis* oil, almond oil, pine oil, olive oil, peanut oil, flax seed oil, wheat germ oil, hemp oil, jojoba oil, linseed oil, macadamia oil, neem oil, argan oil, grape seed oil, thistle oil, and/or algal oil and/or any combination thereof.

5. The monophasic formulation of claim 1, wherein the hydrophobic base is soybean oil, cottonseed oil and/or coconut oil.

6. The monophasic formulation of claim 1, wherein the at least one alcohol is ethanol, isopropyl alcohol, t-butyl alcohol, propyl alcohol, benzyl alcohol, and/or denatured alcohol.

7. The monophasic formulation of claim 1, wherein the at least one emulsifier is polysorbate 20, sorbitan oleate, potassium sorbate, and/or sodium benzoate.

8. A method of repelling an insect pest or a tick, comprising:
   applying the monophasic formulation of claim 1 to a subject or a substrate in an amount effective to repel the insect or tick.

9. The method of claim 8, wherein the insect is a mosquito, sand fly, filth fly, chigger, flea, black fly, deer fly, horse fly, lice, roach, ant, and/or fire ant.

10. The method of claim 8, wherein about 90% to about 100% of the insects and/or ticks are repelled and/or the insects and/or ticks are repelled for up to about 7 hours after application.

11. The method of claim 8, wherein the subject is a human and/or the substrate is fabric, cotton products, clothing, wrist bands, bedding, linens, towels, curtains, draperies, wood products, furniture, carpet, floors, walls, baseboards, netting, paper, water, trash containers, dumps, tents, paint, plants, and/or soil.

12. A product infused with the monophasic formulation of claim 1.

13. The product of claim 12, wherein the product is a textile, a plastic, latex, rubber, cellulose, a wick, a candle, paint, a cosmetic, a lotion, a shampoo, a conditioner, and/or a mousse.

14. The product of claim 13, wherein the textile is clothing, bedding, linens, towels, curtains, draperies, tents, and/or netting.

15. A monophasic formulation comprising:
   2-undecanone that repels insects and ticks in an amount of about 5% to about 10% by volume in the formulation;
   at least one hydrophobic base in an amount of about 45% to about 55% by volume in the formulation;
   at least one alcohol in an amount of about 10% to about 15% by volume in the formulation;
   at least one emulsifier in an amount of about 8% to about 12% by volume in the formulation; and
   oil of lemon *eucalyptus* (OLE) in an amount of about 8% to about 12% by volume in the formulation.

16. The monophasic formulation of claim 15, wherein the hydrophobic base is soybean oil.

17. The monophasic formulation of claim 15, wherein the at least one alcohol is ethanol, isopropyl alcohol and/or denatured alcohol.

18. The monophasic formulation of claim 15, wherein the at least one emulsifier is polysorbate 20 and sorbitan oleate.

19. A method of repelling an insect pest or a tick, comprising:
   applying the monophasic formulation of claim 15 to a subject or a substrate in an amount effective to repel the insect or tick.

20. The method of claim 19, wherein the insect is a mosquito, sand fly, filth fly, chigger, flea, black fly, deer fly, horse fly, lice, roach, ant, and/or fire ant.

21. The method of claim 19, wherein about 90% to about 100% of the insects and/or ticks are repelled and/or the insects and/or ticks are repelled for up to about 7 hours after application.

22. The method of claim 19, wherein the subject is a human and/or wherein the substrate is fabric, cotton products, clothing, wrist bands, bedding, linens, towels, curtains, draperies, wood products, furniture, carpet, floors, walls, baseboards, netting, paper, water, trash containers, dumps, tents, paint, plants, and/or soil.

23. A product infused with the monophasic formulation of claim 15.

24. The product of claim 23, wherein the product is a textile, a plastic, latex, rubber, cellulose, a wick, a candle, paint, a cosmetic, a lotion, a shampoo, a conditioner, and/or a mousse.

25. The product of claim 24, wherein the textile is clothing, bedding, linens, towels, curtains, draperies, tents, and/or netting.

* * * * *

UNITED STATES PATENT AND TRADEMARK OFFICE
CERTIFICATE OF CORRECTION

PATENT NO. : 12,133,527 B2
APPLICATION NO. : 18/158504
DATED : November 5, 2024
INVENTOR(S) : Roe et al.

Page 1 of 1

It is certified that error appears in the above-identified patent and that said Letters Patent is hereby corrected as shown below:

In the Specification

Column 26, Line 38: Please correct "3 – bum" to read --3 – burn--

Column 26, Line 39: Please correct "4 – bum" to read --4 – burn--

Signed and Sealed this
Eleventh Day of March, 2025

Coke Morgan Stewart
*Acting Director of the United States Patent and Trademark Office*